United States Patent [19]
Zaiser et al.

[11] Patent Number: 5,249,476
[45] Date of Patent: Oct. 5, 1993

[54] AUTOMATIC SELECTOR DEVICE FOR MULTI-GEAR CHANGE-SPEED GEARBOX

[75] Inventors: Wolfgang Zaiser, Steinheim; Gerhard Wagner, Remseck, both of Fed. Rep. of Germany

[73] Assignee: Mercedes-Benz AG, Fed. Rep. of Germany

[21] Appl. No.: 886,246

[22] Filed: May 21, 1992

[30] Foreign Application Priority Data

May 30, 1991 [DE] Fed. Rep. of Germany ....... 4117737

[51] Int. Cl.⁵ .................... F16H 59/04; F16H 59/08; F16D 71/04; F16K 51/00
[52] U.S. Cl. .................................. 74/335; 192/139; 251/285; 251/286; 251/287; 251/288
[58] Field of Search .............. 74/335, 867, 868, 869; 192/139; 251/285, 286, 287, 288

[56] References Cited

U.S. PATENT DOCUMENTS

| | | | |
|---|---|---|---|
| 4,204,590 | 5/1980 | Tanaka | 74/520 X |
| 4,204,591 | 5/1980 | Tani et al. | 74/520 X |
| 4,326,433 | 4/1982 | Black et al. | 74/335 X |
| 4,338,832 | 7/1982 | Pelligrino | 74/867 X |
| 4,545,289 | 10/1985 | Weyer | 251/288 X |
| 4,579,015 | 4/1986 | Fukui | 74/335 X |
| 4,595,034 | 6/1986 | Hutson | 251/286 X |
| 4,637,269 | 1/1987 | Hasegawa et al. | 74/335 |
| 4,721,002 | 1/1988 | Horii | 74/360 X |
| 4,754,949 | 7/1988 | Fukamachi | 475/2 X |
| 4,979,599 | 12/1990 | Nishida | 192/3.58 X |
| 5,072,814 | 12/1991 | Hama et al. | 192/3.57 |
| 5,117,953 | 6/1992 | Machida et al. | 192/3.57 |

FOREIGN PATENT DOCUMENTS

| | | |
|---|---|---|
| 735303 | 5/1943 | Fed. Rep. of Germany . |
| 1178718 | 6/1966 | Fed. Rep. of Germany . |
| 2126910 | 11/1972 | Fed. Rep. of Germany . |
| 2744286 | 4/1979 | Fed. Rep. of Germany . |
| 2174158 | 10/1986 | United Kingdom . |
| 2216236 | 10/1989 | United Kingdom . |

Primary Examiner—Leslie A. Braun
Assistant Examiner—David E. Henn
Attorney, Agent, or Firm—Evenson, McKeown, Edwards & Lenahan

[57] ABSTRACT

An automatic selector device for multi-gear change-speed gearbox includes a multi-way valve which can be driven into several valve positions each associated with one gear by a stepper motor whose operation depends on an electronic control unit. Each of the valve positions causes the appropriate gear to be selected. The multi-way valve is connected kinematically to a selector unit which can be actuated manually in order to block gears through the intermediary of a stop and an opposing stop.

11 Claims, 4 Drawing Sheets

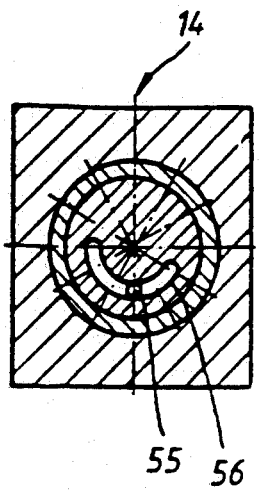
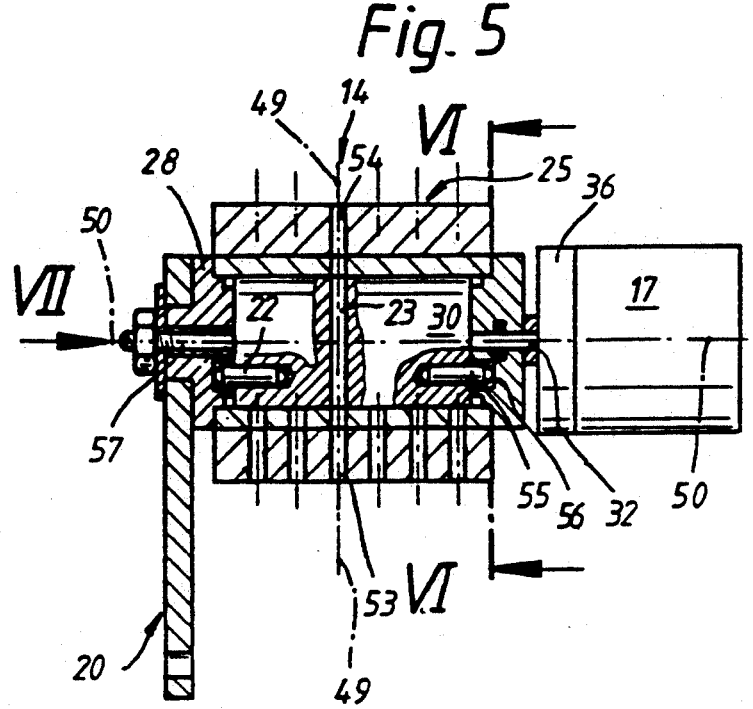
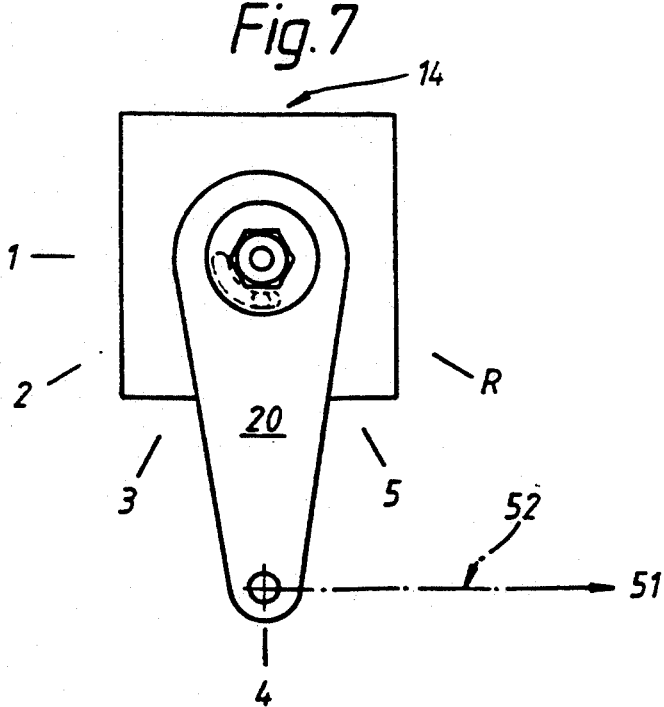

AUTOMATIC SELECTOR DEVICE FOR MULTI-GEAR CHANGE-SPEED GEARBOX

CROSS-REFERENCE TO RELATED APPLICATION

This application is related to application Ser. No. 07/886,259 filed on even date herewith in the name of Wolfgang Zaiser and Gerhard Wagner for AUTOMATIC SELECTOR DEVICE FOR A MULTI-GEAR CHANGE-SPEED GEARBOX.

BACKGROUND AND SUMMARY OF THE INVENTION

The invention relates to an automatic selector device and, more particularly, to a multi-gear change-speed gearbox selector device in which a multi-way valve is arranged to activate selector actuators each used for one gear. The multi-way valve can be driven into several valve positions, each associated with one gear by a valve actuator whose operation depends on an electronic control unit. In these valve positions, the selector actuator exclusively associated with the appropriate gear is caused to take a selection action while the other selector actuators remain in a rest position.

In a selector device of the type shown in DE 27 44 286 Al, the manually selected gear range is evaluated in the electronic control unit which, as a result, itself suppresses from the selection the gears excluded by the gear range selected. A rotary spool of the multi-way valve is driven into its gear positions by a stepper motor controlled by the electronic control unit. The driving range selected by the driver is input into the control unit so that the stepper motor is prevented, within the control electronics, from being driven into the gear positions excluded from the driving range selected. If, for example, the control electronics should fail when driving on a gradient, while the driving range selected is limited to the two lower forward gears in order to utilize the engine braking effect and the other gears are consequently blocked electronically, the gearbox could adopt an uncontrolled driving condition because of the failure of the electronic blocking function.

Another type of hydraulic selector control device is shown in DE 21 26 910 Al for a vehicle with a multi-gear change-speed gearbox with plate clutches for the selection of the driving direction and the gears. These plate clutches are selected hydraulically and are located in the hydraulic circuit of a pressure medium generator. This selector control device has a manually actuated hydraulic multi-way spool whose housing has a rotary spool guided therein a sealed manner and, in the rotary spool, a longitudinal spool guided coaxially and in the longitudinal direction. These spools can be moved by a common manual lever such that two plate clutches can always be connected for one gear by the rotary spool via the housing connections and the respective plate clutch for the driving direction can be connected to the pressure medium generator by the longitudinal spool. In this selector control device, the longitudinal spool can -be fixed relative to the rotary spool by a spring catch device in a neutral position and in one position each for forward travel and reverse travel.

A control device of a different type for the hydraulic actuation of several selector clutches for motor vehicle change-speed gearboxes by a hydraulically adjustable selector control piston influencing the pressure medium supply to the selector clutches is shown in DE-AS 11 78 718. The adjustment force of this selector control piston is controlled by a mechanically actuated control spool located within the selector control piston. The control spool is guided in two hubs fixed on the housing and located within the selector control piston, independently of the selector control piston. This is intended to prevent the control spool from being carried along with the selector control piston in the presence of dirt and jamming, occurring as a result of the dirt, at the control edges and to prevent an undesired gear from being selected independently.

An object on which the present invention is based resides in being able to block gears by a manually actuated selector lever in an automatic selector device of a multi-gear change-speed gearbox in which the gear changes are initiated by an electronic control unit, it being necessary to satisfy the requirement for a mechanical connection between the selector lever and the hydraulic control system for the selector actuators operating by hydraulic pressure medium force in order to provide protection from a failure of the control electronics.

The foregoing object has been achieved in an advantageous manner by arranging an opposing stop so that it moves with a valve element, of the multi-way valve which valve element takes up in each of the gears an associated valve position relative to a valve housing. The position of a stop guided in its movement relative to the valve housing along the path of motion of the opposing stop can be fixed relative to the valve housing with respect to the valve positions to be blocked by a selector actuator which can be actuated manually.

In the selector device of the present invention, the stop actuatable by the manual selector lever interact with an opposing stop, which are connected as a function of the motion to the movable valve element of the multi-way valve such that the relative freedom of movement between these stops corresponds to the gear range selected.

In one embodiment of the present invention, the stop connected to the manual selector lever can be formed by a slot with which a sliding block connected to the movable valve element interacts. The stop can be configured such that the multi-way valve is mechanically prevented from being brought into the valve position for the selection of the reverse gear when only the forward gear range is made available by the selector lever.

The mechanical engagement of the stop device on the multi-way valve actuatable by the manual selector lever has priority over the actuation by the valve actuator whose operation depends on the electronic control unit. If the multi-way valve is driven by the stop into another position, the valve actuator is necessarily driven along with it in a corresponding manner because the stop and the opposing stop are in an opposing position relative to one another.

BRIEF DESCRIPTION OF THE DRAWINGS

These and further objects, features and advantages of the present invention will become more readily apparent from the following detailed description of currently preferred embodiments when taken in conjunction with the accompanying drawings wherein:

FIG. 5 is an axial sectional view containing the valve axis of a second embodiment of the multi-way control valve of the selector device of FIG. 1;

FIG. 6 is a cross-sectional view of the multi-way control valve along line VI—VI of FIG. 5;

FIG. 7 is a side view of the multi-way control valve of FIG. 5 in the direction of the arrow VII.

DETAILED DESCRIPTION OF THE DRAWINGS

Figure 1:
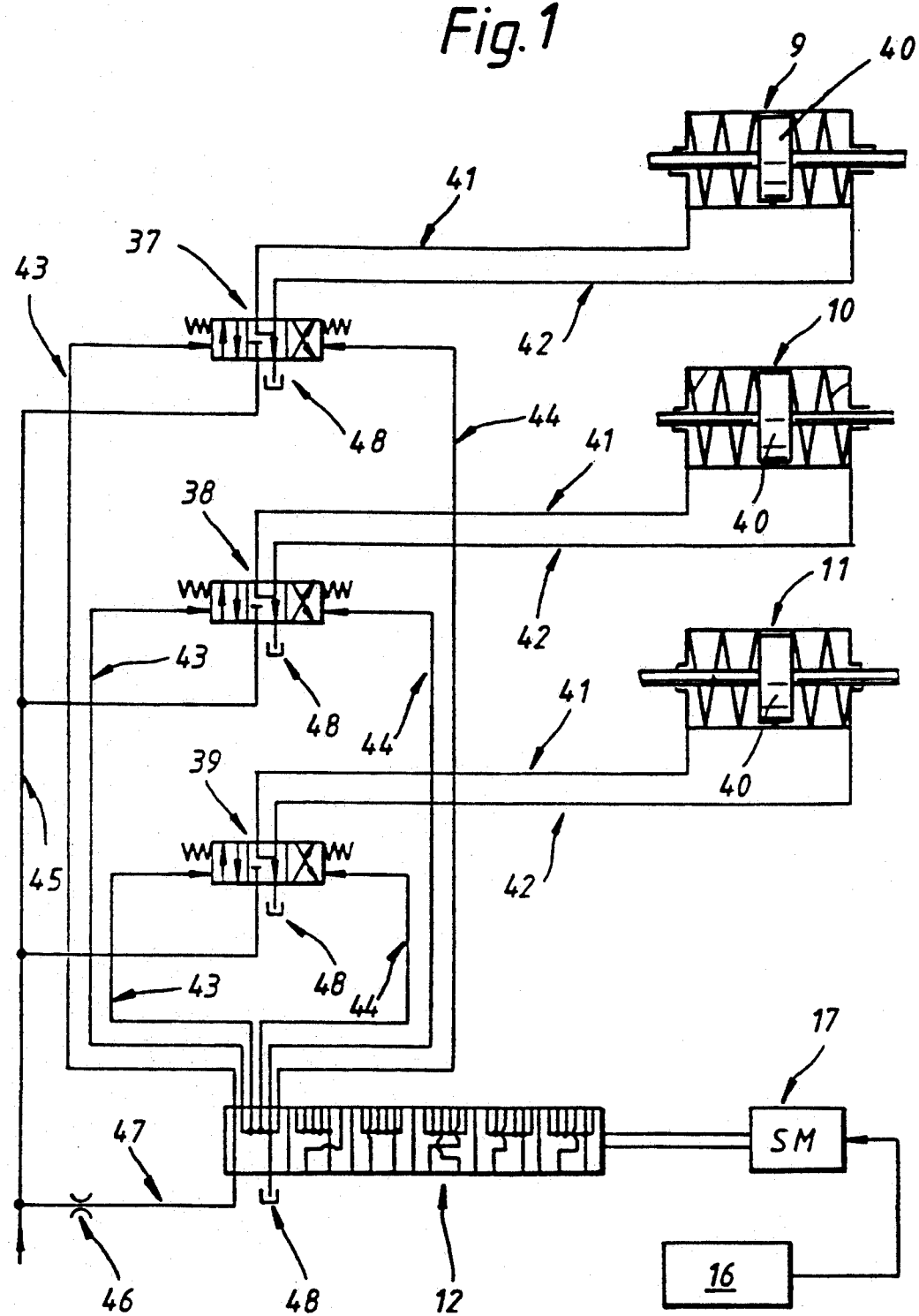
FIG. 1 is a block circuit diagram of an automatic selector device according to the present invention for a 5-speed change-speed gearbox with gearwheels which can be disconnected from their shaft.

Referring to FIG. 1, the selector device operates with three selector actuators 9, 10, 11, each in the form of a 3-position cylinder with a double-acting axial piston 40, which can optionally be driven into a central rest position by springs and, by an operating pressure conduit 41 or 42 respectively in each instance, into a position for a lower gear and into a position for an adjacent higher gear. Thus the gears 1 and 2 are selected by the selector actuator 9, the gears 3 and 4 are selected by the selector actuator 10, and the fifth gear and the reverse gear are selected by the selector actuator 11.

The selector actuators 9, 10, 11 which each actuate, in a conventional manner, a gearwheel clutch connecting to its shaft the loose wheel of the gearwheel stage of the corresponding gear, are each connected to one 4/3-way selector valve 37, 38, 39 by their operating pressure conduits 41 and 42. Each of the 4/3-way selector valves 37, 38, 39 can be driven by springs into its central rest position and is connected to a multi-way control valve 12 by a control pressure conduit 43 in order to initiate the selection of the lower gear and by a control pressure conduit 44 in order to initiate the selection of the higher gear.

The multi-way control valve 12 has six valve positions, respectively associated with one of the gears 1 to 5 or the reverse gear, into which it can be driven by a stepper motor 17 whose operation depends on an electronic control unit 16.

In each of the six valve positions, the control pressure conduit 43 or 44 associated with the corresponding gear is connected to an auxiliary pressure conduit 47 which branches off from a main pressure conduit 45 via a throttle 46 whereas all the other control pressure conduits are connected to a reservoir 48. In FIG. 1, this selection condition is indicated for the first gear, the control pressure conduit 43 of the selector valve 37 being connected to the auxiliary pressure conduit 47 via the multi-way control valve 12 and all the other control pressure conduits 43 and 44 being connected to the reservoir 48. As a result, the operating pressure conduit 41 of the first gear is connected by the selector valve 37 to the main pressure conduit 45, and the operating pressure conduit 42 of the second gear is connected to the reservoir 48. The other gears are selected in a corresponding manner by way of the multi-way control valve 12.

Common to the three embodiments designated generally by numerals 13 to 15 of FIGS. 2 to 8 is the configuration of the multi-way control valve as a rotary spool having a special valve housing plane 49—49 for each of the six gears, all the valve housing planes 49—49 being parallel to one another and normal to the valve axis 50—50.

Figure 2:
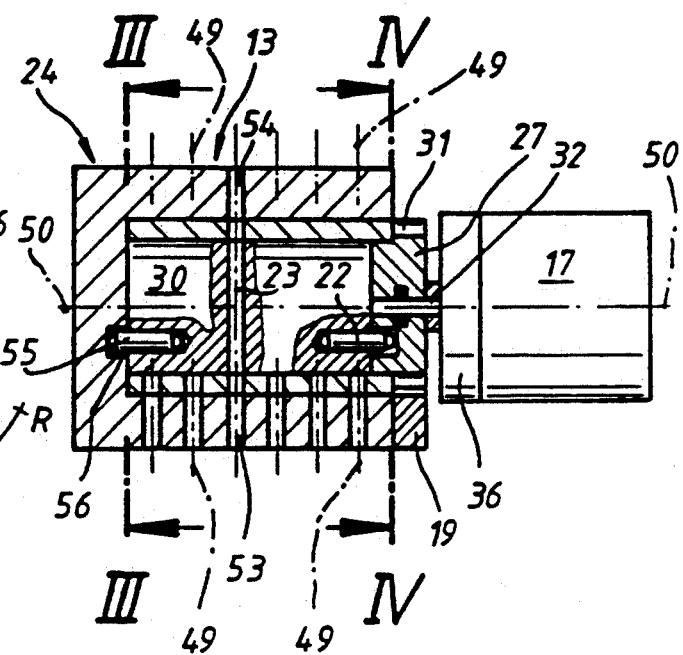
FIG. 2 is an axial sectional view containing the valve axis of a first embodiment of the multi-way control valve of the selector device of FIG. 1.
Figure 8:
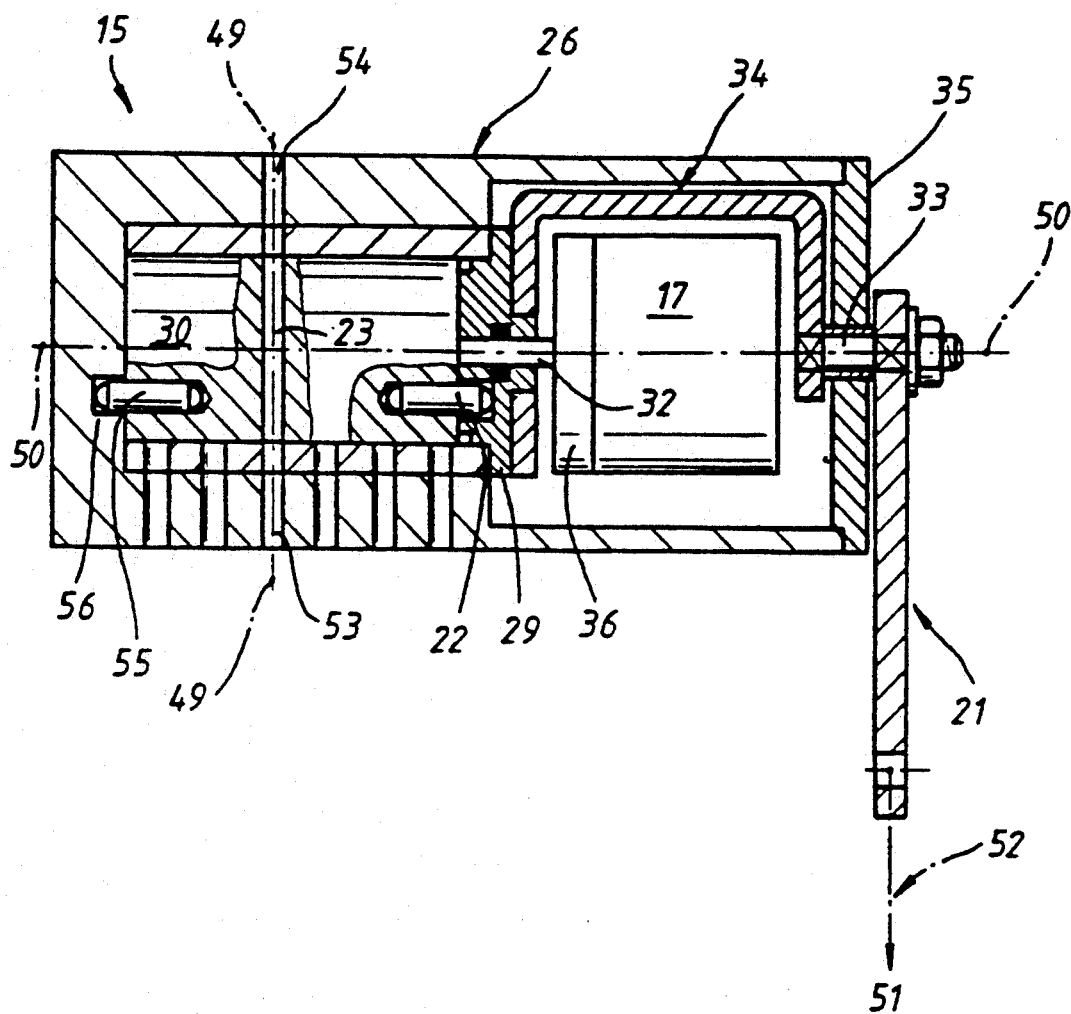
FIG. 8 an axial sectional view containing the valve axis of a third embodiment of the multi-way control valve of the selector device of FIG. 1.

In FIGS. 2, 5 and 8, the respective rotary spool 30 of the three embodiments is shown in the angular position for the fifth gear. In the block circuit diagram of FIG. 1, this fifth gear is associated with the valve housing plane 49—49 located at the fourth position (viewed from the stepper motor 17). A control hole 23 of the rotary spool 30, a valve inlet 53 connected to the auxiliary pressure conduit 47, a valve outlet 54 connected to the control pressure conduit 43 of the selector valve 39 and a valve outlet connected to the reservoir, (not shown) are located in the valve housing plane 49—49, and it is only in this angular position that the control hole 23 is aligned with the valve connections 53 and 54 and is shut off from the valve outlet connected to the reservoir 48, whereas the control hole 23 connects the valve outlet 54 to the valve outlet connected to the reservoir 48 in the other angular positions of the rotary spool 30.

In each of the five other valve housing planes 49-49, a corresponding arrangement occurs with a control hole in the rotary spool 30, with a valve inlet connected to the auxiliary pressure conduit 47, with a valve outlet connected to the control pressure conduit 43 or 44 of the corresponding gear and with a valve outlet connected to the reservoir 48.

For each of the three embodiments 13 to 15, a valve housing 24 or 25 or 26 is used together with the rotary spool 30 and a driving disc 27 or 28 or 29 rotatably located therewithin. The driving discs are each provided with a slot 18 and the rotary spool 30 is provided with a sliding pin 22 engaging in the slot 18. This is done so that valve positions of the rotary spool 30, and hence the associated gears, can be blocked in the conventional manner by a manual selector lever 51.

Each rotary spool 30 and the respective valve housing 24 or 25 or 26 are correspondingly provided with a stop pin 55 and with a corresponding slot 56 in order to limit the rotational range of the rotary spool 30 to the possible gear positions.

Each of the three embodiments 13 to 15 provide for the following to be located in sequence in alignment with the axis of rotation 50—50 of the rotary spool 30, namely the rotary spool 30, a valve shaft 32 permanently connected to the rotary spool 30, an intermediate transmission 36 driving the valve shaft 32 and a stepper motor 17.

Figure 3:
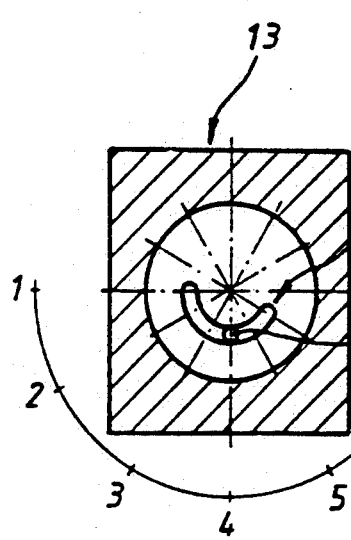
FIG. 3 is a cross-sectional view of the multi-way control valve along line III—III of FIG. 2.
Figure 4:
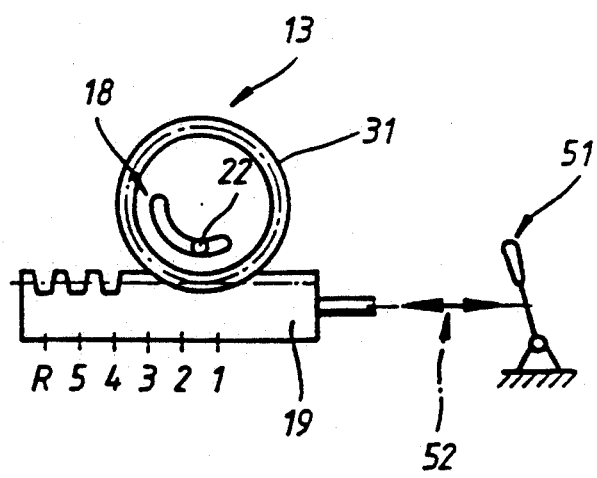
FIG. 4 is a cross-sectional view of the multi-way control valve of FIG. 2 along line IV—IV in FIG. 2.

The three embodiments 13 to 15 differ in that, in embodiment 13 of FIGS. 2 to 4, the driving disc 27 which is located at the end of the rotary spool 30 remote from the stepper motor 17 and which carries, torsionally connected thereto, a toothed wheel 31 centered about the valve axis 50—50, is penetrated by the valve shaft 32 so that the latter can rotate. The toothed wheel 31 engages in a rack 19 which, as an element of a mechanical linkage 52, is connected to the manual selector lever 51.

In embodiment 14 of FIGS. 5 to 7, the driving disc 28 is located on the end of the rotary spool 30 opposite the stepper motor 17. The disc 28 is centered so that it can rotate on a bearing trunnion 57 of the rotary spool 30 and is permanently connected to a setting lever, 20 which is an element of the mechanical linkage 52 leading to the manual selector lever 51.

In embodiment 15 of FIG. 8, the rotary spool 30 with its valve shaft 32, the driving disc 29 which is penetrated by the valve shaft 32 so that the latter can rotate, a U-shaped bracket 34 which is connected at one end of the bracket 34 to the drive disc 29 so that it move therewith the intermediate transmission 36, the stepper motor 17 and a setting shaft 33 connected to the other end of the bracket 34 so that it moves therewith, are located in a common housing 26. The setting shaft 33 penetrating one end wall 35 of the housing 26 so that it can rotate is connected at its outer end at least torsionally to,, a setting lever 21 which is an element of the mechanical linkage 52 leading to the manual selector lever 51.

It is therefore possible to effect a change to the angular position of the slot 18 relative to the slot 56 in the same manner by the manual selector lever 51 in each of the three embodiments 13 to 15 so that with aligned arrangement of the pins 22 and 55, the actual overlap region of the slots 18 and 56 (in the case of non-aligned arrangement, the hypothetical overlap region taking account of the angular offset between the pins 22 and 55) determines which gears are blocked.

Although the invention has been described and illustrated in detail, it is to be clearly understood that the same is by way of illustration and example, and is not to be taken by way of limitation. The spirit and scope of the present invention are to be limited only by the terms of the appended claims.

We claim:

1. An automatic selector device of a multi-gear change-speed gearbox, the selector device having a multi-way valve arranged to activate selector actuators each used for a gear, the multi-way valve being arranged to be driven into several valve positions each associated with one gear by a valve actuator operatively activated by an electronic control unit, valve positions of one of the selector actuators being exclusively associated with an appropriate gear and causing a selection action while other selector actuators remain in a rest position, wherein a stop moves relative to the valve housing along a path of motion of an opposing stop fixedly attached to the valve and can be fixed relative to the valve housing with respect to the valve positions to be blocked by a manually actuatable selector actuator, wherein the opposing stop is arranged to move with a valve element of the multi-way valve, the valve element taking up in each of the gears an associated valve position relative to a valve housing, whereby relative freedom of movement between the stop and the opposing stop correspond to a selected gear range.

2. The selector device according to claim 1, wherein the stop is a slot and the opposing stop is a corresponding sliding pin.

3. The selector device according to claim 1, wherein a mechanical linkage is provided to connect the selector actuator leads to a driving disc rotatably supported on the valve housing, the stop being arranged to move with the driving disc.

4. The selector device according to claim 3, wherein the driving disc has a toothed wheel adapted to engage a rack forming an element in the mechanical linkage.

5. The selector device according to claim 3, wherein a setting lever is connected to the driving disc to move therewith.

6. The selector device according to claim 3, wherein a valve shaft penetrates the driving disc such that the valve shaft can rotate, with the valve shaft being connected to a rotary spool of the multi-way valve to move therewith.

7. The selector device according to claim 3, wherein the driving disc is torsionally connected via a U-shaped bracket to setting shaft located coaxially with the multi-way valve at an axial distance therefrom.

8. The selector device according to claim 7, wherein, between the valve shaft and the setting shaft, a stepper motor partially enclosed by the U-shaped bracket is operatively arranged to drive the valve shaft.

9. The selector device according to claim 8, wherein a rotary spool of the multi-way valve, the driving disc, the stepper motor and the setting shaft are arranged in series in a housing having an end wall penetrated by the setting shaft.

10. The selector device according to claim 3, wherein an intermediate transmission is spatially located between the driving disc and the stepper motor.

11. The selector device according to claim 1, wherein the multi-way valve is arranged to actuate selector valves which switch on and off the operating pressure of the selector actuators.

* * * * *